United States Patent
Takeda et al.

(10) Patent No.: US 11,916,209 B2
(45) Date of Patent: Feb. 27, 2024

(54) POWER SUPPLY DEVICE

(71) Applicant: SANYO Electric Co., Ltd., Osaka (JP)

(72) Inventors: Nao Takeda, Hyogo (JP); Naotake Yoshida, Hyogo (JP); Kazuhiro Harazuka, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 397 days.

(21) Appl. No.: 17/267,326

(22) PCT Filed: Jul. 26, 2019

(86) PCT No.: PCT/JP2019/029338
§ 371 (c)(1),
(2) Date: Feb. 9, 2021

(87) PCT Pub. No.: WO2020/054227
PCT Pub. Date: Mar. 19, 2020

(65) Prior Publication Data
US 2021/0344062 A1   Nov. 4, 2021

(30) Foreign Application Priority Data
Sep. 11, 2018   (JP) .................................. 2018-169254

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/647* (2015.04);
(Continued)

(58) Field of Classification Search
None
See application file for complete search history.

(56) References Cited

U.S. PATENT DOCUMENTS

| 2010/0167115 A1 | 7/2010 | Okada et al. |
| 2010/0190050 A1* | 7/2010 | Ochi .................. H01M 50/293 |
| | | 429/160 |

(Continued)

FOREIGN PATENT DOCUMENTS

| JP | 2010049842 A | * 3/2010 |
| JP | 2010-157450 | 7/2010 |
| WO | 2018/061894 A1 | 4/2018 |

OTHER PUBLICATIONS

Abstract of JP-2010049842-A. (Year: 2010).*
(Continued)

*Primary Examiner* — Gregg Cantelmo
(74) *Attorney, Agent, or Firm* — WHDA, LLP

(57) ABSTRACT

The power supply device includes a plurality of battery cells each having a rectangular outer shape, a plurality of separators configured to insulate adjacent battery cells, and a restraining member assembling the plurality of battery cells and the plurality of separators. Each of separators includes interposed plate disposed between adjacent battery cells, heat insulating member having a sheet-like shape and disposed between interposed plate and adjacent battery cells, peripheral wall protruding from interposed plate toward adjacent battery cells and defining a housing space housing adjacent battery cells, and a plurality of ribs provided inside peripheral wall. The plurality of ribs holds heat insulating member.

7 Claims, 5 Drawing Sheets

(51) Int. Cl.
*H01M 10/647* (2014.01)
*H01M 10/658* (2014.01)
*H01M 50/209* (2021.01)
*H01M 50/227* (2021.01)
*H01M 50/289* (2021.01)
*H01M 50/291* (2021.01)
*H01M 50/264* (2021.01)
*H01M 10/6557* (2014.01)

(52) U.S. Cl.
CPC ..... *H01M 10/658* (2015.04); *H01M 10/6557* (2015.04); *H01M 50/209* (2021.01); *H01M 50/227* (2021.01); *H01M 50/264* (2021.01); *H01M 50/289* (2021.01); *H01M 50/291* (2021.01)

(56) References Cited

U.S. PATENT DOCUMENTS

2013/0316211 A1* 11/2013 Kim .................. H01M 10/6557
429/99
2020/0058912 A1 2/2020 Kuramitsu et al.

OTHER PUBLICATIONS

International Search Report of PCT application No. PCT/JP2019/029338 dated Sep. 10, 2019.
English Translation of Chinese Search Report dated Dec. 16, 2023 issued in counterpart Chinese Patent Application No. 201980059560.5.

* cited by examiner

POWER SUPPLY DEVICE

CROSS-REFERENCE TO RELATED APPLICATIONS

This application is a U.S. national stage application of the PCT International Application No. PCT/JP2019/029338 filed on Jul. 26, 2019, which claims the benefit of foreign priority of Japanese patent application No. 2018-169254 filed on Sep. 11, 2018, the contents all of which are incorporated herein by reference.

TECHNICAL FIELD

The present invention relates to a power supply device including a plurality of battery cells.

BACKGROUND ART

In recent years, electric vehicles using a power supply device for propulsion have become widespread. The electric vehicles having various configurations are known. Examples of the electric vehicles include a battery electric vehicle (BEV) equipped with a drive motor and a hybrid electric vehicle (HEV) equipped with an engine in addition to a motor. A plurality of battery cells is used in the power supply device equipped in these electric vehicles. Each battery cell is a rechargeable secondary battery such as a lithium ion battery or a nickel hydrogen battery. This type of power supply device desirably occupies a smaller space and is expected to improve space efficiency. As a space-efficient power supply device, there is known a power supply device including a plurality of rectangular batteries stacked in one direction, an insulating separator disposed between battery cells, and a restraining member that assembles the plurality of rectangular batteries (PTL 1).

CITATION LIST

Patent Literature

PTL 1: Unexamined Japanese Patent Publication No. 2010-157450

SUMMARY OF THE INVENTION

It is known that a secondary battery causes various problems when temperature becomes high. In particular, if a chemical reaction of an internal power generation element is promoted by heat, the secondary battery may be further self-heated by heat generated from the chemical reaction. Meanwhile, the power supply device of PTL 1 has a configuration in which the battery cells are disposed close to each other. Thus, when a battery cell is self-heated due to some abnormality, heat is transferred from the battery cell to an adjacent battery cell. When an amount of heat transferred from the battery cell in an abnormal state to the adjacent battery cell is large, the transferred heat may promote the chemical reaction of the power generation element inside the adjacent battery cell. In order to suppress such heat propagation, the separator provided for insulation needs to be thick, but such a configuration will increase a size of the power supply device, and reduce space efficiency of the power supply device.

The present invention has been made to solve such problems, and a main object of the present invention is to provide a power supply device configured to suppress heat transfer between adjacent battery cells while suppressing an increase in a size of the power supply device.

A power supply device according to one aspect of the present invention includes a plurality of battery cells each having a rectangular outer shape, a plurality of separators insulating adjacent battery cells, and a restraining member assembling the plurality of battery cells and the plurality of separators. Each of the separators includes an interposed plate disposed between the adjacent battery cells, a heat insulating member having a sheet-like shape and disposed between the interposed plate and the adjacent battery cells, a peripheral wall protruding from the interposed plate toward the adjacent battery cells and defining a housing space housing the adjacent battery cells, and a plurality of ribs provided inside the peripheral wall. The plurality of ribs holds the heat insulating member.

The power supply device of the present invention can thermally insulate adjacent batteries while maintaining the functions required as the separator, and thus has an effect of suppressing heat transfer between the adjacent battery cells while suppressing an increase in the size of the power supply device.

DESCRIPTION OF EMBODIMENTS

First, a background of an idea of a configuration of a heat insulating member according to one aspect of the present invention will be described. As shown in PTL 1, in a typical power supply device, a plurality of battery cells is disposed in an identical manner. An insulating separator is disposed between adjacent battery cells in order to prevent short circuits between the adjacent battery cells. Meanwhile, in recent years, as a capacity of battery cells has increased, an amount of energy possessed by each battery cell has tended to increase.

As described above, the power supply device of PTL 1 has a configuration in which battery cells are disposed close to each other. Thus, when a battery cell is self-heated due to some abnormality, heat is transferred from the battery cell to an adjacent battery cell. When an amount of heat transferred from the battery cell in an abnormal state to the adjacent battery cell is large, the transferred heat may promote the chemical reaction of the power generation element inside the adjacent battery cell. When a capacity of the battery cell is increased, the amount of heat transferred from the battery cell in an abnormal state to the adjacent battery cell becomes relatively large, and this phenomenon may cause a problem.

In response to this problem, the inventors of the present invention have studied a configuration that employs a separator having a heat insulating property. In a conventional power supply device, a highly moldable resin is used for the separator in order to form the separator into a shape capable of achieving various functions such as insulation of the adjacent battery cells and prevention of short circuits through condensed water. It is therefore necessary to increase a material thickness of the separator in order to improve the heat insulating property. However, the increased thickness of the separator will increase the size of the power supply device, and reduce a capacity per volume of the power supply device. Meanwhile, as a member having a high heat insulating property, there is a heat insulating member having a sheet-like shape. However, this type of heat insulating member has low moldability, and is difficult to mold into a shape other than a sheet-like shape. In view of such circumstances, the inventors have studied a configuration for making it possible to use a heat insulating member having a sheet-like shape.

First Exemplary Embodiment

Figure 1:
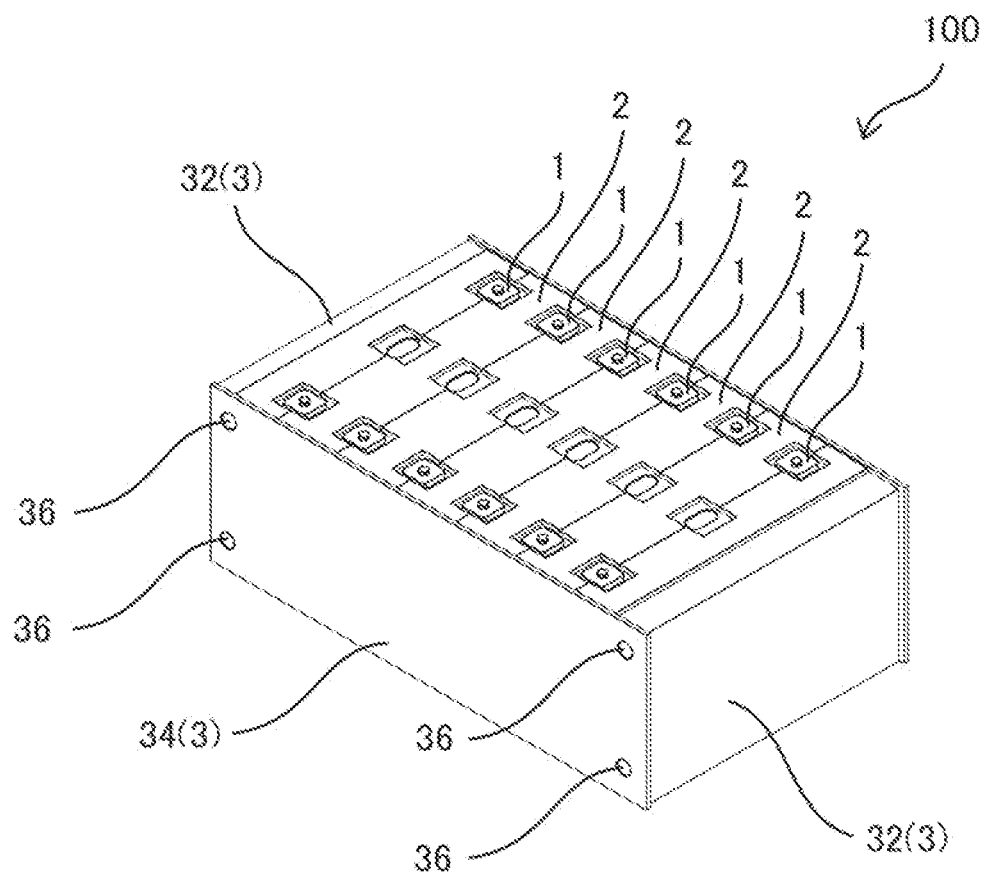
FIG. 1 is a perspective view of a power supply device according to a first exemplary embodiment of the present invention.

FIG. 1 is a perspective view showing power supply device 100 according to a first exemplary embodiment of the present invention. As shown in FIG. 1, power supply device 100 includes a plurality of battery cells 1, a plurality of separators 2, and restraining member 3 assembling the plurality of battery cells 1 and the plurality of separators 2. The plurality of battery cells 1 is disposed in one direction. Each of the plurality of separators 2 is disposed between adjacent battery cells 1. The plurality of separators 2 includes a heat insulating member having a sheet-like shape to prevent short circuits between adjacent battery cells 1. Further, each of the separators 2 has a heat insulating property and suppresses heat transfer between adjacent battery cells. The plurality of battery cells 1 is connected in series or in parallel via a bus bar (not shown). In power supply device 100, a voltage and capacity of the power supply device are determined in accordance with a number of battery cells 1 connected in parallel and a number of battery cells 1 connected in series. As battery cells 1, various secondary batteries such as lithium ion secondary batteries and nickel hydrogen batteries can be adopted.

The heat insulating member included in each separator 2 is a sheet having a thickness of 0.1 mm to 1.5 mm, and includes a fiber sheet including a woven fabric, a non-woven fabric, or the like, and a porous material supported between the fibers of the fiber sheet. The heat insulating member suitable for the exemplary embodiment of the present invention has a thermal conductivity of less than or equal to 0.02 W/(m·K). The porous material preferably has a void structure such as xerogel or aerogel. In particular, silica aerogel and silica xerogel have a nano-sized void structure that restricts a movement of air molecules, and have excellent heat insulating performance. In addition, silica xerogel can stably maintain the structure against external pressure. Silica particles have a high melting point, and thus silica xerogel also has high heat resistance. Various fibers can be used as the fibers configuring the fiber sheet, and flame-retardant fibers having heat resistance may be included. As the flame-retardant fiber, there is known acrylic oxide fiber, flame-retardant vinylon fiber, polyetherimide fiber, aramid fiber, glass fiber, and the like. In particular, the fiber sheet, including glass fiber, can be expected to improve rigidity and suppress creep deformation in addition to enhancing the heat resistance. The heat insulating member using the fiber sheet including flame-retardant fiber does not break even if the battery cells are heated to a high temperature due to thermal runaway, and stably blocks conduction of thermal energy to effectively prevent induction of thermal runaway.

The fibers included in the above heat insulating member are preferably synthetic fibers having a small fiber diameter. The heat insulating property of the heat insulating member is due to characteristics of powder described later, and thus a large amount of powder can be included in the heat insulating material by using a synthetic fiber having a small fiber diameter as a base material. The fiber sheet used in the present exemplary embodiment has preferably a fiber diameter of 1 μm to 30 μm in order to achieve both thermal conductivity and productivity.

Further, the above heat insulating member may be molded by adding a thermoplastic resin. The heat insulating member to which the thermoplastic resin is added can improve the rigidity. Coating a surface of the heat insulating member can impart various characteristics to the insulating member. For example, covering with a coating layer including alumina having a low emissivity can suppress an influence of radiant heat transfer of the heat insulating member. By adjusting additives during formation of the heat insulating member in this way, physical properties can be appropriately imparted in accordance with required performance while maintaining the heat insulating property and heat resistance.

As shown in FIG. 1, restraining member 3 includes a pair of end plates 32 disposed at both ends of the plurality of battery cells 1 stacked in a stacking direction, and a plurality of binding bars 34 fixed to the pair of end plates 32. Each end of binding bars 34 is connected to each end plate 32. Each binding bar 34 is fixed to each end plate 32 via set screws 36.

Binding bars 34 are manufactured by processing a metal plate having a predetermined thickness into a predetermined width. Each end of binding bars 34 is connected to each end plate 32, connects the pair of end plates 32, and holds each battery cell 1 between them. The pair of end plates 32 is fixed by binding bars 34 in a predetermined size, thereby suppressing expansion of battery cells 1 stacked between end plates 32 and bind bars 34. Stretched binding bars 34 would not be able to prevent the expansion of battery cells 1. Thus, binding bars 34 are manufactured by processing a metal plate having a strength that does not stretch due to expansion pressure of battery cells 1, for example, a stainless plate such as SUS304 or a metal plate such as a steel plate into a width and thickness with sufficient strength.

Although binding bars 34 in FIG. 1 are fixed to end plates 32 with set screws 36, but do not have to be fixed with screw members. Specifically, bind bars 34 can be fixed by using welding, a locking structure, or the like. Further, in the power supply device in FIG. 1, binding bars 34 are fixed to side surfaces of end plates 32, but a fixed structure of the end plates and the binding bars is not limited to the configuration shown in the drawing. A function required as binding bars 34 is to restrict a relative distance between the pair of end plates 32. End plates 32 and binding bars 34 may be configured in any configuration as long as a displacement of the pair of end plates can be restricted.

(Battery Cell)

Figure 2:
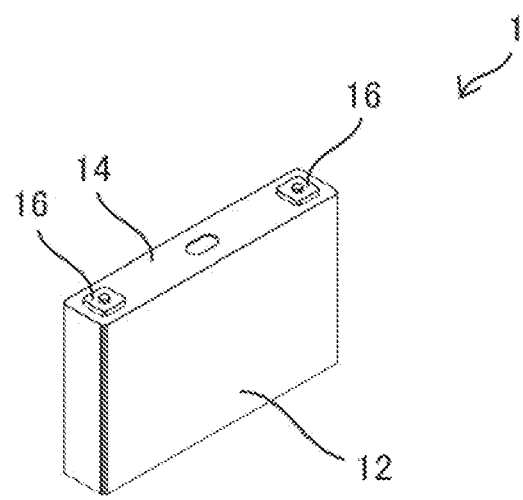
FIG. 2 is a perspective view of a battery cell in FIG. 1.

As shown in FIG. 2, each battery cell 1 includes a rectangular parallelepiped exterior can 12 and sealing body 14 provided with positive and negative electrode terminals 16. Further, each battery cell 1 has an electrode body housed in exterior can 12, which is filled with an electrolytic solution, thereby having a property of expanding and contracting in response to charge and discharge or deterioration.

Exterior can 12 is formed in a box shape having an opening. Sealing body 14 is welded to exterior can 12, and closes the opening of exterior can 12. Specifically, exterior can 12 is manufactured by deep-drawing a metal plate such as aluminum or an aluminum alloy. Sealing body 14 is manufactured by a metal plate such as aluminum or an aluminum alloy as exterior can 12 is manufactured. Positive and negative electrode terminals 16 are fixed to both ends of sealing body 14. Sealing body 14 is welded while being inserted into the opening of exterior can 12. Typically, sealing body 14 is airtightly fixed to exterior can 12 by irradiating a boundary between an outer circumference of sealing body 14 and an inner circumference of exterior can 12 with a laser beam.

The battery cells having the exterior can and the sealing body including metal expose the metal on a surface of the battery cells. This type of battery cells may be configured to cover a surface of the exterior can with an insulating heat-shrinkable tube in order to prevent a short circuit through condensed water or the like. In the present exemplary embodiment, if necessary, a configuration in which the surface of exterior can 12 is covered with a heat-shrinkable tube may be adopted.

(Separator 2A)

Figure 3:
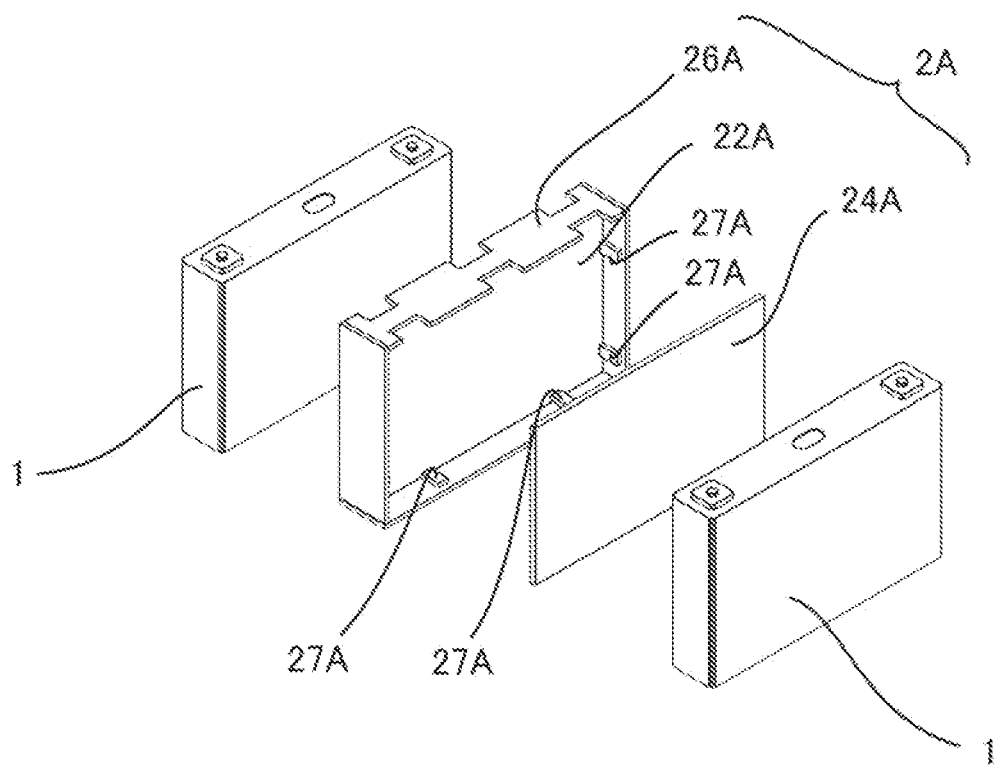
FIG. 3 is a perspective view showing an example of a separator in FIG. 1.
Figure 4:
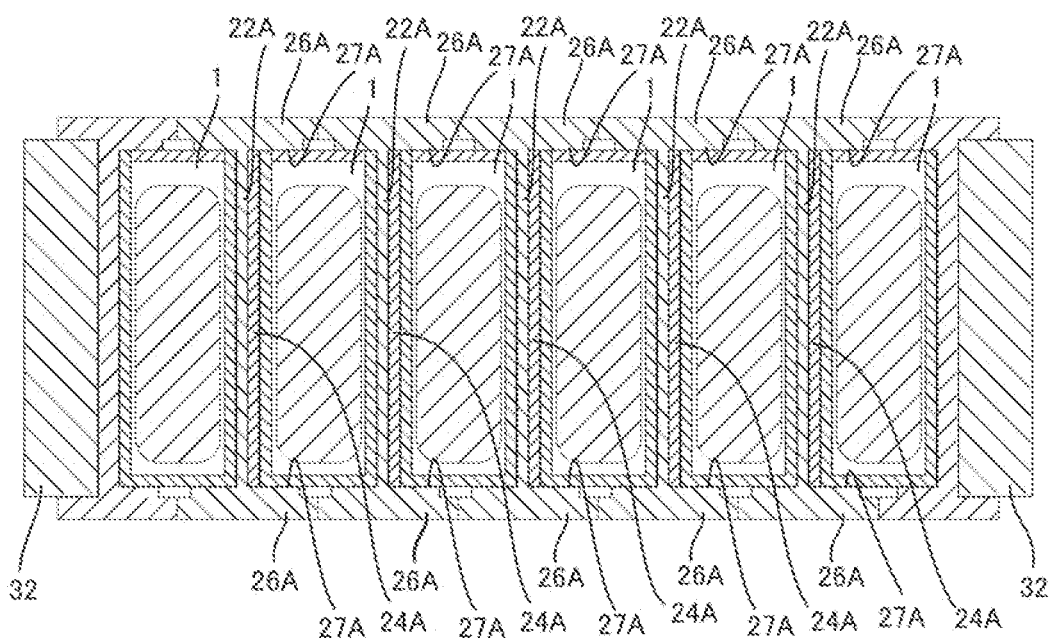
FIG. 4 is a sectional view of the power supply device for explaining a shape of the separator in FIG. 3.

FIG. 3 is a perspective view showing an example of separators 2 shown in FIG. 1. As shown in FIGS. 3 and 4, separator 2A includes interposed plate 22A interposed between adjacent battery cells 1, peripheral wall 26A that protrudes from a peripheral edge of interposed plate 22A toward both adjacent battery cells 1, and heat insulating member 24A having a sheet-like shape and disposed between interposed plate 22A and adjacent battery cell 1.

Peripheral wall 26A protrudes from interposed plate 22A toward adjacent battery cells 1, and defines a housing space for housing battery cells 1 on both sides of separator 2A. Peripheral wall 26A is provided with a plurality of ribs 27A inside in order to hold battery cells 1 disposed in the housing space. Specifically, peripheral wall 26A has wall surfaces facing each other, and a plurality of ribs 27A is provided on the facing wall surfaces.

As heat insulating member 24A, the above heat insulating member is preferably used. Heat insulating member 24A is disposed in the housing space defined inside peripheral wall 26A, and is held by the plurality of ribs 27A provided on peripheral wall 26A. It is sufficient that one heat insulating member 24A is provided between adjacent battery cells 1, and that heat insulating member 24A is disposed in at least one of a pair of the housing spaces provided in separator 2A.

In this configuration, heat insulating member 24A is held by the plurality of ribs 27A. Thus, heat insulating member 24A does not shift in position when each battery cell 1 is disposed in the housing space of separator 2A, and assembly workability is improved.

Further, in the above configuration, heat insulating member 24A is held by the plurality of ribs 27A provided on the facing wall surfaces. Thus, a gap is formed between the facing wall surfaces of peripheral wall 26A and heat insulating member 24A. It is therefore possible to suppress a rise of dew condensation water level due to a capillary phenomenon even if interposed plate 22A, battery cells 1, and heat insulating member 24A are in close contact with each other.

(Separator 2B)

Figure 5:
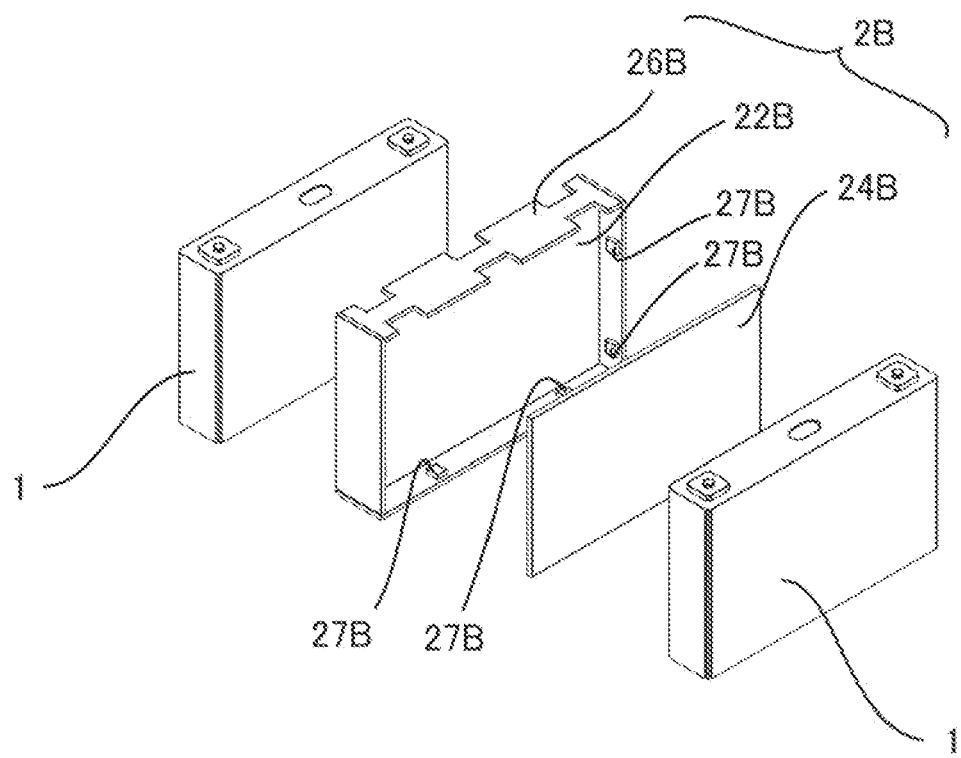
FIG. 5 is a perspective view showing an example of the separator in FIG. 1.
Figure 6:
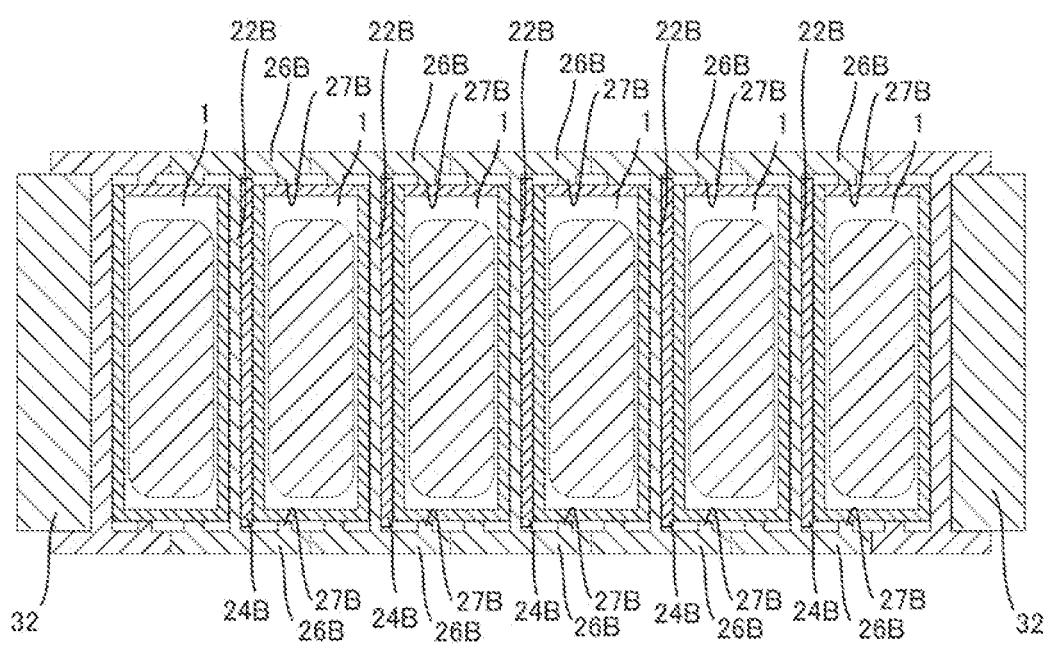
FIG. 6 is a sectional view of the power supply device for explaining a shape of the separator in FIG. 5.

FIG. 5 is a perspective view showing an example of separators 2 shown in FIG. 1. As shown in FIGS. 5 and 6, separator 2B includes interposed plate 22B interposed between adjacent battery cells 1, peripheral wall 26B that protrudes from a peripheral edge of interposed plate 22B toward both adjacent battery cells 1, and heat insulating member 24B having a sheet-like shape and disposed between interposed plate 22B and adjacent battery cell 1.

Peripheral wall 26B protrudes from interposed plate 22B toward adjacent battery cells 1, and defines a housing space for housing battery cells 1 on both sides of separator 2. Peripheral wall 26B is provided with a plurality of ribs 27B inside in order to hold battery cells 1 disposed in the housing space. Specifically, peripheral wall 26B has wall surfaces facing each other, and the plurality of ribs 27B is provided on the facing wall surfaces. Further, a gap is formed between interposed plate 22B and the plurality of ribs 27B.

Heat insulating member 24B is disposed in the housing space defined inside peripheral wall 26B, and is interposed between interposed plate 22B and the plurality of ribs 27B. Heat insulating member 24B disposed in the housing space defined inside peripheral wall 26B is held while the displacement is restricted by the plurality of ribs 27B.

In this configuration, heat insulating member 24B is held by the plurality of ribs 27B. Thus, heat insulating member 24B does not shift in position when each battery cell 1 is disposed in the housing space of separator 2B, and assembly workability is improved.

Second Exemplary Embodiment

Figure 7:
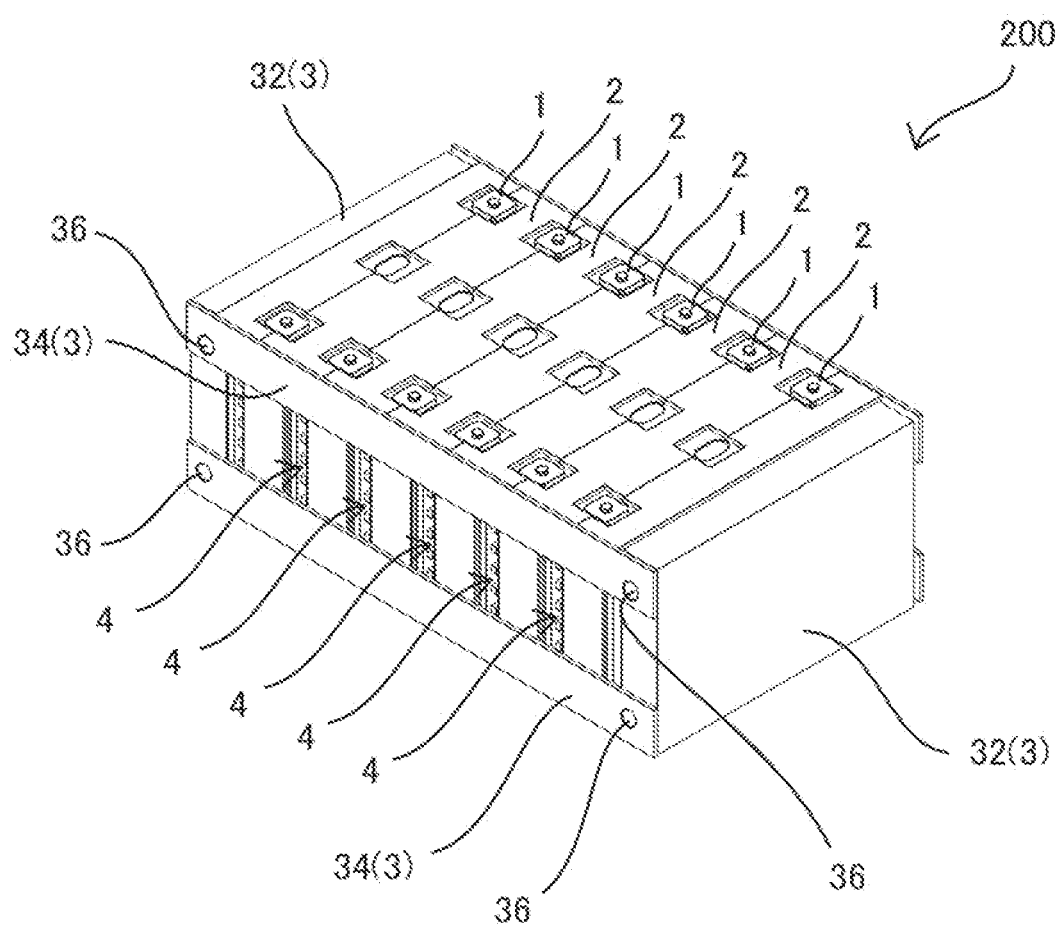
FIG. 7 is a perspective view of a power supply device according to a second exemplary embodiment of the present invention.

FIG. 7 is a perspective view showing power supply device 200 according to a second exemplary embodiment of the present invention. In the following description, components similar to components in the first exemplary embodiment are designated by the same reference marks, and the description thereof will not be repeated. Power supply device 200 according to the second exemplary embodiment is configured such that cooling gap 4 is formed between each separator 2 and each battery cell 1. Battery cells 1 are configured such that cooling can suppress deterioration of the batteries because high temperatures promote deterioration of battery cells 1. As illustrated in FIG. 7, each binding bar 34 preferably has a shape so as to introduce cooling air into cooling gap 4 between each separator 2 and each battery cell 1. Specifically, in power supply device 200 illustrated in FIG. 7, a pair of binding bars 34 is provided on one side surface, and an inlet of cooling gap 4 faces between the pair of binding bars 34.

(Separator 2C)

Figure 8:
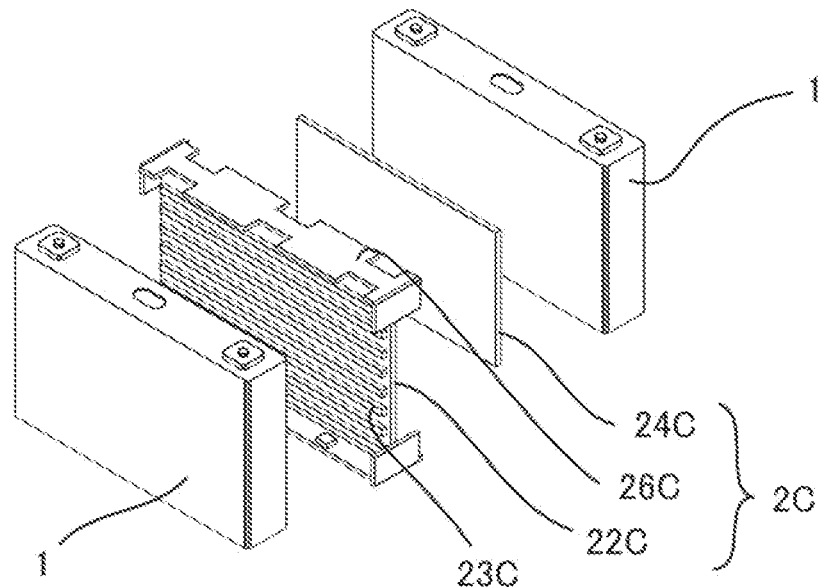
FIG. 8 is a perspective view showing an example of the separator in FIG. 4.
Figure 9:
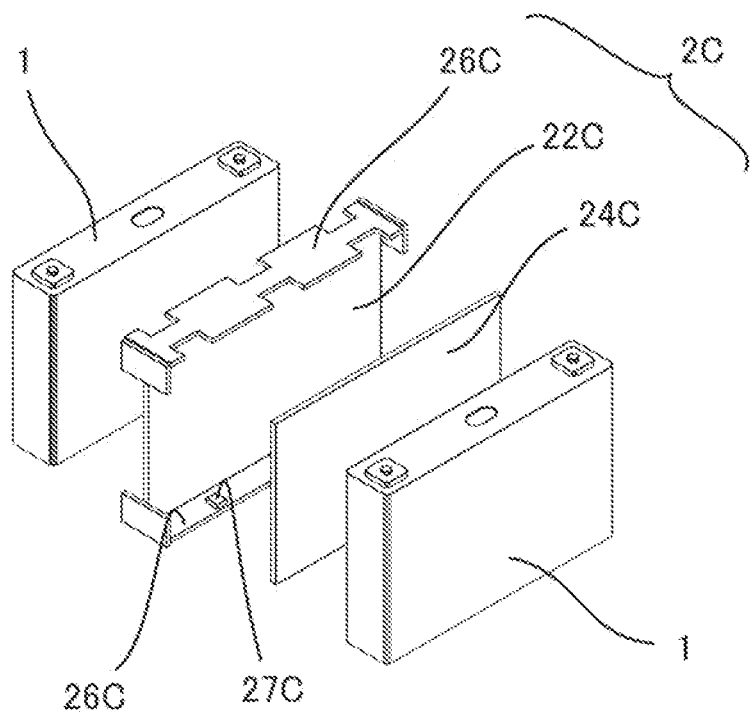
FIG. 9 is a perspective view of FIG. 6 as viewed from another direction.

FIGS. 8 and 9 are perspective views for showing an example of separators 2 shown in FIG. 7. As shown in FIGS. 8 and 9, separator 2C has peripheral plate 22C interposed between adjacent battery cells 1 and peripheral wall 26C that protrudes from a peripheral edge of interposed plate 22C toward both adjacent battery cells 1. Peripheral wall 26C protrudes from interposed plate 22C toward adjacent battery cells 1, and defines a housing space for housing battery cells 1 on both sides of separator 2C.

As shown in FIG. 8, interposed plate 22C is provided with a plurality of ribs 23C on one surface. Each of the plurality of ribs 23C is in contact with each exterior can 12 of adjacent battery cells 1 to form cooling gap 4 between adjacent ribs 23C. Each battery cell 1 can be cooled by cooling gas flowing through cooling gap 4.

Separator 2C includes heat insulating member 24C disposed on an opposite side of the surface of interposed plate 22C where ribs 23C are provided. As heat insulating member 24C, the above heat insulating member is preferably used. Heat insulating member 24C is disposed in the housing space defined inside peripheral wall 26C of separator 2C. In this state, each battery cell 1 is disposed in the housing space. In this configuration, heat insulating member 24C is provided on the surface of interposed plate 22C located on the opposite side to the surface on which the plurality of ribs 23C is formed. This can suppress heat transfer between adjacent battery cells 1 without hindering cooling of battery cells 1 by the cooling air flowing through cooling gap 4.

Further, as shown in FIG. 9, peripheral wall 26C is provided with a plurality of ribs 27C inside. Specifically, peripheral wall 26C has wall surfaces facing each other, and the plurality of ribs 27C is provided on the facing wall surfaces. Further, a gap is formed between interposed plate 22C and the plurality of ribs 27C. Separator 2C includes heat insulating member 24C disposed on one surface of interposed plate 22C. Heat insulating member 24C is disposed in the housing space defined inside peripheral wall 26C, and is interposed between interposed plate 22C and the plurality of ribs 27C. The displacement of heat insulating member 24C disposed in the housing space defined inside peripheral wall 26C is restricted by the plurality of ribs 27C.

In this configuration, heat insulating member 24C is held by the plurality of ribs 27C. Thus, heat insulating member 24C does not shift in position when each battery cell 1 is disposed in the housing space of separator 2C, and assembly workability is improved.

The power supply device having the above configuration includes a plurality of battery cells each having a rectangular outer shape, a plurality of separators insulating adjacent battery cells, and a restraining member assembling the plurality of battery cells and the plurality of separators. Each of the separators includes an interposed plate disposed between the adjacent battery cells, a heat insulating member having a sheet-like shape and disposed between the interposed plate and the adjacent battery cells, a peripheral wall protruding from the interposed plate toward the adjacent battery cells, and a plurality of ribs provided inside the peripheral wall. The plurality of ribs holds the heat insulating member. This configuration allows the separators to insulate adjacent batteries from each other while maintaining the required functions. Therefore, the power supply device having such a configuration can suppress heat transfer between the adjacent battery cells while suppressing an increase in size of the power supply device.

The present invention has been described based on the exemplary embodiments. It should be understood by those skilled in the art that these exemplary embodiments are for illustrative purposes, various modifications are possible for each of the components and combinations of processes, and such modifications are within the scope of the present invention.

REFERENCE MARKS IN THE DRAWINGS

1: battery cell
12: exterior can
14: sealing body
16: electrode terminal
2, 2A, 2B, 2C: separator
22A, 22B, 22C: interposed plate
23C: rib
24A, 24B, 24C: heat insulating member
26A, 26B, 26C: peripheral wall
27A, 27B, 27C: rib
3: restraining member
32: end plate
34: binding bar
36: set screw
4: cooling gap
100, 200: power supply device

The invention claimed is:

1. A power supply device comprising:
   a plurality of battery cells each having a rectangular outer shape;
   a plurality of separators each configured to insulate adjacent battery cells, the plurality of separators each including:
      an interposed plate disposed between the adjacent battery cells;
      a heat insulating member having a sheet shape and disposed between the interposed plate and a corresponding one of the adjacent battery cells;
      peripheral walls protruding from the interposed plate toward the adjacent battery cells and defining a housing space housing the adjacent battery cells; and
      a plurality of ribs provided inside each of the peripheral walls, the plurality of ribs holding the heat insulating member; and
   a restraining member configured to assemble the plurality of battery cells and the plurality of separators.

2. The power supply device according to claim 1, wherein the plurality of ribs holds the adjacent battery cells.

3. The power supply device according to claim 1, wherein the plurality of separators is each provided with a gap between the interposed plate and the plurality of ribs and the heat insulating member is disposed in the gap between the interposed plate and the plurality of ribs.

4. The power supply device according to claim 1, further comprising:
   a fiber sheet including a main fiber; and
   a powder supported by the fiber sheet.

5. The power supply device according to claim 4, wherein the powder includes silica aerogel or silica xerogel.

6. The power supply device according to claim 4, wherein the fiber sheet includes at least one of acrylic oxide fiber, flame-retardant vinylon fiber, polyetherimide fiber, aramid fiber, or glass fiber.

7. The power supply device according to claim 4, wherein the heat insulating member further includes a thermoplastic resin.

* * * * *